United States Patent [19]

Eapen et al.

[11] 4,248,902
[45] Feb. 3, 1981

[54] INTERMEDIATE-MOISTURE MEAT PRODUCTS

[75] Inventors: Kuttikandathil E. Eapen; Marvin L. Kahn, both of Williamsville, N.Y.

[73] Assignee: Rich Products Corporation, Buffalo, N.Y.

[21] Appl. No.: 21,937

[22] Filed: Mar. 19, 1979

Related U.S. Application Data

[63] Continuation-in-part of Ser. No. 920,953, Jun. 30, 1978, Pat. No. 4,199,605, which is a continuation-in-part of Ser. No. 871,995, Jan. 24, 1978, Pat. No. 4,154,863, and Ser. No. 763,613, Jan. 28, 1977, Pat. No. 4,146,652.

[51] Int. Cl.³ .......................... A23B 4/14; A23L 1/31
[52] U.S. Cl. ..................................... 426/332; 426/327; 426/646; 426/641; 426/657; 426/658
[58] Field of Search ............... 426/321, 332, 327, 646, 426/641, 657, 549, 658

[56] References Cited

U.S. PATENT DOCUMENTS

| 2,803,547 | 8/1957 | Globe | 426/332 |
|---|---|---|---|
| 3,652,296 | 3/1976 | Wilkerson | 426/332 |
| 3,745,021 | 7/1973 | Middlesworth | 426/646 |
| 3,873,736 | 3/1975 | Palmer | 426/332 |
| 3,914,445 | 10/1975 | Pavey | 426/614 |
| 3,974,296 | 8/1976 | Burkwall, Jr. | 426/646 |
| 4,055,676 | 10/1977 | Foulkes | 426/332 |

*Primary Examiner*—Jeanette M. Hunter

[57] ABSTRACT

Microbiologically stable meat products are prepared by controlling their sugar/fat content. These products are of intermediate-moisture content and have sufficient sugar solutes to provide a bacteriostatic effect. The sugars used are predominantly of low molecular weight and in addition provide a significant freezing point depression. It is preferred that the sugar comprise a substantial amount of fructose, dextrose or a combination thereof because these sugars resist crystallization which causes apparent hardness at low temperatures.

The products of this invention can be used to make a variety of consumer products, including hot dogs, meat loaf, sausage and other processed meat products.

20 Claims, No Drawings

INTERMEDIATE-MOISTURE MEAT PRODUCTS

CROSS-REFERENCE

This application is a continuation-in-part and contains subject matter divided out of U.S. patent application Ser. No. 920,953, filed June 30, 1978 U.S. Pat. No. 4,199,605. This application and U.S. Application Ser. No. 920,953 are continuations-in-part of U.S. Application Ser. No. 871,995, filed Jan. 24, 1978 U.S. Pat. No. 4,154,863, and U.S. patent application Ser. No. 763,613, filed Jan. 28, 1977 now U.S. Pat. No. 4,146,652.

BACKGROUND OF THE INVENTION

A recent development in the food industry is the emphasis on intermediate-moisture foods which may be stored and marketed in a substantially non-refrigerated condition. These foods are designed to avoid the need to be packaged in hermetically sealed containers and to be commercially sterilized or maintained in a frozen or refrigerated state throughout the period of distribution and storage by the consumer.

The intermediate-moisture foods are based on the principle of reducing the availability of the water in the food for microbial growth. The availability of water for spore germination and microbial growth in a food is closely related to its relative vapor pressure, commonly designated as its water activity. It was found that the use of a wide variety of water-soluble solutes, or osmotic agents, has the effect of depressing the water activity of the foods to levels at which most bacteria will not grow.

The water activity of a food is defined as the partial pressure of water in the food divided by the saturation pressure of water at the temperature of the food. The water activity can be determined by placing a sample of the food in a container which is then sealed, and, after equilibrium is reached, determining the relative humidity above the sample. Most products of the type disclosed herein have between 30 to 60% moisture, and a water activity between 0.85 and 0.9.

An early application of the technique of controlling water activity in order to reduce bacteria growth was in animal foods. For example, U.S. Pat. No. 3,202,514, issued Aug. 24, 1965, disclosed an animal food having 15 to 30% moisture and 15 to 35% water-soluble solids, principally sugar, with a proteinaceous meaty substance. Subsequently, other foods were formulated with an intermediate-moisture content, such as egg products (U.S. Pat. No. 3,640,731, issued Feb. 8, 1972), pancake batter (U.S. Pat. No. 3,753,734, issued Aug. 21, 1973), whippable bases for confectionary use (U.S. Pat. No. 3,958,033, issued May 18, 1976) and meats (U.S. Pat. No. 4,075,357, issued Feb. 21, 1978). The water content and water activity of these foods are brought to as low a value as is practical in order to insure their long-term stability without refrigeration. The main difficulty with these foods is that their low-moisture content may detract from their palatability, texture and mouth-feel. This technique therefore has found its greatest commercial applicability in the pet-food market, where palatability requirements are not as stringent.

It is, of course, desirable to be able to avoid refrigeration and freezing of food products to reduce the cost involved, and particularly for the consumer, to avoid the inconvenience of unpacking, handling and then defrosting the typically rock-hard frozen foods. However, freezing is an extremely safe and suitable technique for long-term storage and provides the manufacturer with great leeway in incorporating any of a wide variety of ingredients in foods which would otherwise be short-lived. The food products of this invention are still relatively soft when stored at freezer temperatures compared to conventional meat products.

It is an object of this invention to provide a class of meat products which are normally maintained at freezer temperature, but which possess the requisite microbiological stability for storage at refrigerator or room temperatures for an extended length of time without spoilage. It is a further object of this invention to provide meat products that remain relatively soft and pliable when stored at freezer temperatures. Other objects, and advantages, of this invention will be apparent from the ensuing specification and examples.

THE INVENTION

The present invention is directed to microbiologically stable intermediate-moisture meat products which are normally maintained at freezer temperature, but which, after removal from the freezer, may be held at room temperature or at refrigerator temperature for a considerable period of time without spoilage because of the bacteriostatic effect of the solutes/water ratio, and in particular a high sugar/water ratio. Several formulations made according to this invention were evaluated by storing them for seven days at 72° F. These samples were then tested for microbiological activity and showed a coliform count of zero and a very low plate count. This use of a high sugar/water ratio to prevent spoilage is of great current interest in view of recent findings that some conventional preservatives, such as sodium nitrite, may be harmful to human health.

Several meat products prepared according to this invention were evaluated for softness and pliability by lowering their temperature to 0° F. and comparing the softness to that of a commercially available product. This comparison was carried out by the use of a penetrometer, which is a standard laboratory device that is available from Labline, Inc., of Chicago, Illinois. The penetrometer measures the distance that a hard rubber cone to which a specified weight is applied will penetrate into a product. Thus, the higher the penetrometer reading, the softer the product. The penetrometer readings showed that the products of this invention tend to be softer at 0° F. than the commercial product with which it was compared.

The products of this invention can be consumed as food in various forms, including, for example, hot dogs, luncheon meats, sausage and processed spreads, and the standard methods of preparation of these items are well known to those familiar with the art. The principles and techniques which have been developed for other intermediate-moisture foods are applicable to the present invention, as modified in the manner explained herein below.

The meat products of this invention are characterized by a high sugar content which provides microbiological stability. The sugars used have a low molecular weight, being primarily dextrose and fructose, which comprise together at least about 50% and preferably at least about 75% of the total sugar content. The fructose, although sweeter than the dextrose, is preferred since it has a lesser tendency to crystallize and cause apparent hardness. For most of the meat products disclosed herein, it is preferred that any fats used in addition to the fat found in the meat include at least partially unsaturated fats which tend to provide nutritional advantages, although they are less stable than saturated fats. The fat content is usually less than the water content in order to allow the formation of a stable oil-in-water emulsion.

The foods of this invention are generally characterized by a water activity of about from 0.8 to 0.92. Although most intermediate-moisture products will conventionally have a water activity below 0.85, some sacrifice in texture and taste may be required to meet this standard. Since the foods of this invention are often maintained at freezer temperature until ready to be used, a water activity of 0.85 to 0.90 is usually adequate. Freezer temperatures, of course, are adequate to maintain the microbiological stability of foods and even moderate control of water activity is adequate to extend the useful life of these products after removal from the freezer. Freezer temperature, unless otherwise indicated, refers to temperatures of from about −5° F. to +10° F., which represents a common range for both home and store freezers.

Several mathematical methods are available for calculating water activity, even of formulations containing different solutes and non-solutes. Rough calculations based on the additive effect of the number of moles of each component multiplied by the activity of the component are useful for estimating water activity. Such calculations reduce the number of experimental measurements that might otherwise be needed and thus assist in reaching a suitable formulation more quickly. A combination of mathematical techniques with trial and error experiments followed by analytical measurements for determining water activity will lead to acceptable results.

Commercially available devices exist for measuring the water activity of formulations. For example, a formulation may be placed in a container until equilibrium is reached after which the humidity in the container is measured. The water activity is then determined by reference to standard tables. For example, electric hygrometers, which are devices commonly used to measure water activity, contain sensors impregnated with salts such a lithium chloride or potassium chloride. Water is absorbed in the sensor and causes a change in electrical resistance which is measured by a wheatstone bridge. Reference curves based on solutions of known humidity are used to relate the electrical readings to water activity.

Throughout this application, all amounts are by weight unless stated otherwise. In the examples, the amounts have been adjusted to a basis of 100. Percentages are based upon total formulation weight, unless a different basis is given.

The meat products of this invention are generally characterized as being microbiologically stable and comprising about from 30 to 60% water, at least 10% sugar that comprises from about 20 to about 80% fructose based on total sugar content in a ratio of water of about from 1:6 to 1:1.5, preferably about 1:2, about from 5 to 30% fat, about from 2 to 3% non-fat dry milk solids, about from 8 to 15% meat protein and minor but effective amounts of salt, flavoring and other conventional ingredients, such as preservatives and colorants, provided that the solutes content is adequate to provide the product with a water activity of about from 0.8 to 0.92.

The meat products of this invention were prepared by mixing the various ingredients, including the ground-up or comminuted meat, by methods that are apparent to those skilled in the art. In the practice of this invention, it is preferred to combine the sugar that is in the form of corn syrup with the cold water (when cold water is used) and the sodium chloride and cool the resulting mixture to 0° F. This mixture is combined with an emulsion consisting of the meat, non-fat dry milk solids, dextrose (when used), spices and other additives, and the additional fat, which is preferably an unsaturated oil that has been cooled to 35° F.

Sugar is employed as the principal source of water soluble solids and typically may range in weight percentage of the composition anywhere from about 10 to 25% depending upon the particular sugar and sugar mixture relied upon to offer the desired bacteriostatic protection. As the moisture content of the product increases in the intermediate-moisture range, the level of a given sugar will correspondingly increase in order to maintain a sufficient bacteriostatic effect. The level of sugar chosen will also vary depending upon the pressure and level of auxiliary water soluble solids also offering a similar increase in osmotic pressure to the aqueous phase of the composition; thus, a variety of low average molecular weight materials may be included as part of the water soluble solids in the aqueous phase and will augment the sugars in their role of providing sufficient osmotic pressure to prevent bacterial decomposition.

The term "water soluble solids" is used to apply to any additive material which is substantially soluble in water at room temperature or at temperatures comparable to those practiced in processing the ingredients of the foods. For example, included in the class of water soluble non-sugar solids that can be employed are certain inorganic salts used at a level compatible with palatability requirements, e.g., sodium chloride and potassium chloride.

The relative weight percent of the water soluble solids to the moisture content of the total product, when initially incorporated into the product during its manufacture and preparatory to packaging, determines the ultimate functionality of the solids in providing the requisite bacteriostatic effect. The level of water soluble solids may be varied as may the level of moisture initially incorporated within the aforesaid respective ranges. However, in varying these levels, the relationship of water soluble solids in solution to the water should be controlled so as to afford the desired osmotic pressure. It will be found that the level of sugar that should be employed under the conditions of the present invention will constitute a major percent by weight of the water soluble solids.

The meat products of this invention have a high sugar content which tends to promote nonenzymatic browning. This phenomenon is caused by complex reactions between the amino groups of proteins and the keto groups of sugars, which are known collectively as the Maillard Reaction. This nonenzymatic browning leads to undesirable darkening of the food product as well as off-odors and flavors. These reactions can also reduce the nutritional value of foods. Sugars such as dextrose are known to be capable of use at a lower level than sucrose to achieve an equivalent bacteriostatic effect, but are reducing saccharides which are prone to undergo the undesirable Maillard reaction. Fructose is even more susceptible to the browning reaction. This reaction and other oxidative reactions are progressively retarded as the temperature is lowered from room temperature to refrigerator temperature to freezer temperature. Hence the products of this invention preferably are designed for storage at refrigerator and freezer temperatures, unlike the conventional intermediate-moisture foods which are stored and used at room temperature, and thus the foods of this invention can tolerate the large amounts of dextrose and fructose used.

The term "sugar" as it is employed in the present context is to be understood as meaning any of a number of useful saccharide materials which are capable of increasing the osmotic pressure of the water in which they are dissolved, thereby giving rise to the requisite bacteriostatic effect. Included in the list of useful sugars are the monosaccharides, disaccharides and polysaccharides and their degradation products; e.g., pentoses, including aldopentoses, methylpentoses and ketopentoses such as xylose and arabinose; a deoxyaldose such as rhamnose; hexoses and reducing saccharides, for example aldohexoses such as glucose, glactose and mannose; the ketohexoses such as fructose and sorbose; disaccharides such as lactose and maltose; non-reducing disaccharides such as a sucrose and other polysaccharides such as dextrin and raffinose; and hydrolyzed starches which contain as their constituents oligosaccharides. Typically, the commercially available mixtures of invert sugars are used which contain dextrose and levulose, as well as maltose and corn syrup solids. The sugars should be of a low molecular weight so as to offer a substantial effect in increasing the osmotic pressure of the sugar solution.

The fats used in this invention, in addition to the fats that are found in the meat, include saturated and unsaturated animal and vegetable fats, preferably vegetable oils that are highly unsaturated. Fats high in unsaturation include safflower oil, corn oil, soybean oil, cottonseed oil, peanut oil, and sunflower oil. Unsaturated fats as used in this specification are those having an iodine value of about at least 50 which include partially hydrogenated fats and the more highly unsaturated fats with an iodine value above about 100. Especially preferred are fats having an iodine value of between about 100 and about 130. These fats are recommended for dietary purposes, particularly for those people with a high plasma cholestrol level, a condition associated with arteriosclerosis. An unsaturated fat particularly useful in this invention is soybean oil type 106, which is a 100% soybean oil lightly hydrogenated to an iodine value of 106.

The saturated fats include the hydrogenated oil products of coconut, cottonseed, corn, soybean, peanut, olive, etc. Fats having a melting point of 90°-94° F. are preferred, because the melting point should be below body temperature.

The meats used in this invention can be any meats that are ordinarily used in consumer meat products. For example, the meat can be either beef, pork or chicken, or mixtures of these. Generally, the meat is ground up or comminuted before it is combined with the other ingredients. In addition to the different kinds of meat, different grades of meat, for example, standard or choice grade beef, may be used, which will contain different proportions of protein, fat and water.

The products of this invention contain protein in an amount of about from 8 to 15%, preferably about from 8 to 12%, most preferably about from 8 to 9%.

Non-fat dry milk solids may also be used in this invention, preferably in an amount of about from 1 to 5%, most preferably 2 to 3% based on the total composition.

Many types of salts are used in the composition of this invention for flavoring, including common salt (sodium chloride), sodium or potassium phosphates, citrates, chlorides, and the like, in amounts about from 0 to 6%, but preferably about from 1 to 4%.

The sweet taste of the sugar in the composition may be diminished by the addition of quinine or various quinine salts, preferably quinine hydrochloride, in an amount of about from 2 to 125 ppm.

Other ingredients known to those skilled in the art may also be employed in relatively small amounts to impart their characteristic effects to the compositions of the present invention. For example, emulsifiers may be used, as well as preservatives such as monosodium glutamate and sodium nitrite and antimycotics such as sorbates. In addition, ingredients such as flavoring agents, colorants, vitamins, minerals and the like may be used to enhance palatability and nutritional value.

The following examples are included to show compositions useful in the practice of this invention, and are not intended to be limiting, but rather illustrative of some approaches that may be taken. Of course, the amounts of the various ingredients may be varied in accordance with the spirit and scope of this description. Each of these examples were prepared according to the process described above.

In addition, it must be recognized that the examples are difficult to reproduce exactly principally because of the variation in meat from piece to piece.

EXAMPLE 1

Illustrative of the meat products useful in the practice of this invention is a composition in which the sugar to water ratio was approximately 1:3.5 and the sugar content comprised about 76% fructose, 8% dextrose and 15% lactose. The fructose and dextrose were added in the form of Isomerose 900, a corn syrup having a sugar content of about 90% fructose and 10% dextrose, and having a total content of 71% solids and 29% water. The lactose was added in the form of non-fat dry milk solids, which comprises about 55% lactose. The meat in this example was choice grade beef, which comprised about 35% fat, 14.9% protein and 49.4% water. The spice mix was a mixture of various minor ingredients, including flavorings, colorants and preservatives.

The formulation used in this example was:

| Ingredient | Percentage |
| --- | --- |
| Beef choice grade | 77.0% |
| Isomerose 900 | 14.3 |
| Sodium chloride | 2.0 |
| Potassium chloride | 2.0 |
| Nutmeg | 0.1 |
| Cinnamon | 0.1 |
| Non-fat dry milk solids | 3.5 |
| Spice mix | 1.0 |

The percentages of the total composition of fat, sugar, water and protein in the above formulation were as follows:

| Ingredient | Percentage |
| --- | --- |
| fat | 27.0% |
| sugar from corn syrup | 10.2% |
| sugar from non-fat dry milk solids | 1.9 |
| total sugar | 12.1 |

| Ingredient | Percentage |
|---|---|
| water from meat | 38.0 |
| water from corn syrup | 4.1 |
| total water | 42.1 |
| protein | 11.5 |

A hot dog made according to this formulation had a water activity of 0.898 and upon storage for 7 days at 72° F. had a coliform count of zero and a standard plate count of 630 spores/gram.

EXAMPLE 2

Another example of a product of this invention is a composition using standard grade beef that comprises 21% fat, 18% protein and 60% water. The remaining ingredients were the same as in Example 1, but in proportions such that the sugar to water ratio was about 1:3.

The formulation used in this example was:

| Ingredient | Percentage |
|---|---|
| Beef standard grade | 71.4% |
| Isomerose 900 | 20.6 |
| Sodium chloride | 2.0 |
| Potassium chloride | 2.0 |
| Nutmeg | 0.1 |
| Cinnamon | 0.1 |
| Non-fat dry milk solids | 2.8 |
| Spice mix | 1.0 |

The percentages of fat, sugar, water and protein in the above formulation were as follows:

| Ingredient | Percentage |
|---|---|
| fat | 15.0% |
| sugar from corn syrup | 14.6% |
| sugar from non-fat dry milk solids | 1.5 |
| total sugar | 16.1 |
| water from meat | 42.8 |
| water from corn syrup | 6.0 |
| total water | 48.8 |
| protein | 12.9 |

A hot dog made according to this formulation had a water activity of 0.897 and upon storage for 7 days at 72° F. gave a coliform count of zero and a standard plate count of 2040 spores/gram.

EXAMPLE 3

In this example, the meat used was beef chunks comprising 8% fat, 20% protein, 71% water and the other ingredients were the same as those described in Examples 1 and 2. The sugar to water ratio in this example was about 1:2.8.

The formulation used in this example was:

| Ingredient | Percentage |
|---|---|
| Beef chunks | 67.0% |
| Isomerose 900 | 26.4 |
| Sodium chloride | 2.0 |
| Potassium chloride | 2.0 |
| Nutmeg | 0.1 |
| Cinnamon | 0.1 |
| Non-fat dry milk solids | 1.4 |
| Spice mix | 1.0 |

The percentages of fat, sugar, water and protein in the above formulation were as follows:

| Ingredient | Percentage |
|---|---|
| fat | 5.4% |
| sugar from corn syrup | 18.7% |
| sugar from non-fat dry milk solids | 0.8 |
| total sugar | 19.5 |
| water from meat | 47.6 |
| water from corn syrup | 7.7 |
| total water | 55.3 |
| protein | 13.4 |

A hot dog made according to this example had a water activity of 0.913 and upon storage for 7 days at 72° F. gave a coliform count of zero and a standard plate count of 1630 spores/gram.

EXAMPLE 4

In this example, standard grade beef was used and the corn syrup was about 71% sugar solids with a sugar content of about 52% dextrose and 40% fructose. In addition, standard grade dextrose was added to the composition and the total formulation had a sugar to water ratio of about 1:1.75.

The formulation used in this example was:

| Ingredient | Percentage |
|---|---|
| Beef standard grade | 56.0% |
| Corn syrup | 16.8 |
| Sodium chloride | 1.6 |
| Non-fat dry milk solids | 2.2 |
| Dextrose | 10.4 |
| Soybean oil | 12.0 |
| Spice mix | 1.0 |

The percentages of fat, sugar, water and protein in the above formulation were as follows:

| Ingredient | Percentage |
|---|---|
| soybean oil | 12.0% |
| beef fat | 11.8 |
| total fat | 23.8% |
| sugar from corn syrup | 11.9 |
| sugar from non-fat dry milk solids | 1.2 |
| dextrose | 10.4 |
| total sugar | 23.5 |
| water from meat | 33.6 |
| water from corn syrup | 4.9 |
| total water | 38.5 |
| protein | 10.1 |

EXAMPLE 5

Another illustration of the meat products useful in the practice of this invention was a composition in which the sugar to water ratio was approximately 1:3.5. In this example, no dextrose was added, but a portion of the water content was cold water that was added during blending.

The formulation used in this example was:

| Ingredient | Percentage |
| --- | --- |
| Beef standard grade | 56.0% |
| Corn Syrup | 16.8 |
| Sodium chloride | 3.0 |
| Non-fat dry milk solids | 2.2 |
| Soybean oil | 17.5 |
| Cold water | 3.5 |
| Spice mix | 1.0 |

The percentages of fat, sugar, water and protein in the above formulation were as follows:

| Ingredient | Percentage |
| --- | --- |
| soybean oil | 17.5% |
| beef fat | 11.8 |
| total fat | 29.3% |
| sugar from corn syrup | 11.9 |
| sugar from non-fat dry milk solids | 1.2 |
| total sugar | 13.1 |
| water from meat | 33.6 |
| water from corn syrup | 4.9 |
| cold water | 3.5 |
| total water | 42.0 |
| protein | 10.1 |

EXAMPLE 6

This example illustrates a preferred embodiment of this invention. The ingredients were the same as in Example 5, with the exception of cold water. The ratio of sugar to water in this example was about 1:2.

The formulation used in this example was:

| Ingredient | Percentage |
| --- | --- |
| Beef standard grade | 49.0% |
| Corn syrup | 26.8 |
| Sodium chloride | 3.5 |
| Non-fat dry milk solids | 2.2 |
| Soybean oil | 17.0 |
| Spice mix | 1.0 |

The percentages of fat, sugar, water and protein in the above formulation were as follows:

| Ingredient | Percentage |
| --- | --- |
| soybean oil | 17.0% |
| beef fat | 10.3 |
| total fat | 27.3% |
| sugar from corn syrup | 19.0 |
| sugar from non-fat dry milk solids | 1.2 |
| total sugar | 20.2 |
| water from meat | 29.4 |
| water from corn syrup | 7.8 |
| total water | 37.2 |
| protein | 8.8 |

The products of Examples 1 through 3 were evaluated for softness and pliability by the penetrometer test procedure decribed above. The temperature of the products was lowered to freezer temperature, about from 0° to 5° F., and the tests were run with a penetrometer with weights of 20 to 70 grams. The hot dogs of Examples 1 through 3 gave higher readings, which shows that they were softer than the commercially available product. The penetrometer readings were as follows:

|  | 20 grams | 70 grams |
| --- | --- | --- |
| Commercially available hot dog | 20.3 | 33.3 |
| Hot dog according to Example 1 | 22.7 | 36.0 |
| Hot dog according to Example 2 | 29.7 | 43.7 |
| Hot dog according to Example 3 | 31.7 | 42.7 |

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the scope of this invention and the following claims.

What is claimed is:

1. A microbiologically stable meat food product comprising about from 30 to 60% water, at least 10% sugar in a ratio to water of about from 1:6 to 1:1.5; wherein in said sugar component the amount of fructose plus dextrose is from about 50 to 75%, and the amount of fructose in said sugar component is from about 20 to 80%; about from 5 to 30% fat, about from 8 to 15% meat protein, and minor but effective amounts of salt, provided that the solutes content is adequate to provide the product with a water activity of about from 0.80 to 0.92.

2. The product according to claim 1 in which the water activity is about from 0.85 to 0.9.

3. The product according to claim 1 wherein the fat content comprises unsaturated fat in a ratio to saturated fat of about from 2:1 to 1:1.

4. The product according to claim 3 wherein the unsaturated fat is selected from the group consisting of safflower oil, corn oil, soybean oil, cottonseed oil, peanut oil and sunflower oil and mixtures thereof.

5. The product according to claim 4 wherein the unsaturated fat has an iodine value of about from 100 to 130.

6. The product according to claim 1 wherein the sugar content contains about from 35 to 45% fructose and about from 45 to 55% dextrose.

7. The product according to claim 1 wherein the meat protein is selected from the group consisting of beef, chicken and pork and mixtures thereof.

8. The product according to claim 1 which contains about from 2 to 3% non-fat dry milk solids.

9. The process according to claim 1 wherein said sugar is comprised of about 75% fructose.

10. The meat product according to claim 1 wherein said sugar is comprised of about 90% fructose and about 10% dextrose.

11. The product according to claim 5 or claim 6 or claim 7 which comprises about from 40 to 45% water, sugar in a ratio to water of about 1:3.5, and about from 25 to 30% fat.

12. The product according to claim 5 or claim 6 or claim 7 which comprises about from 45 to 50% water, sugar in a ratio to water of about 1:3, and about from 12 to 18% fat.

13. The product according to claim 5 or claim 6 or claim 7 which comprises about from 50 to 60% water, sugar in a ratio to water of about from 1:4 to 1:2, and about from 5 to 10% fat.

14. The product according to claim 5 or claim 6 or claim 7 which comprises about from 35 to 45% water, sugar in a ratio to water of about from 1:2.5 to 1:1.5, and about from 20 to 30% fat.

15. The process for making a meat product comprising about from 30 to 60% water, at least about 10% sugar in a ratio to water of about 1:6 to 1:1.5, wherein in said sugar the fructose content is about 20 to 80%, and the dextrose plus fructose content is about 50 to 75%, about 5 to 30% fat, about from 8 to 15% meat protein, minor but effective amounts of salt, said meat product having a water activity of about from 0.80 to 0.92, which comprises the steps of:

combining sugar in the form of a fructose containing corn syrup with the salt and sufficient cold water such that the final composition contains the desired amount of water;

cooling said corn syrup, salt and water mixture to 0° F.;

combining comminuted meat with sufficient additional fat in the form of oil that has been cooled to 35° F. and sufficient additional dextrose, non-fat dry milk solids, spices, flavorings and preservatives such that the final composition contains the recited amount of fat, protein and sugar; and combining the meat and fat mixture with the corn syrup, water and salt mixture to form a homogeneous product.

16. The process according to claim 15 in which the additional fat is an unsaturated fat having an iodine value of about from 100 to 130.

17. The microbiologically stable meat product according to any of claims 1 through 14, 9 or 10 which is a hot dog.

18. the process according to claim 15 wherein said sugar is comprised of about 75% fructose.

19. The meat product according to claim 15 wherein said sugar is comprised of about 90% fructose and about 10% dextrose.

20. The process according to claims 15, 16, 18 or 19 wherein said homogeneous product is a hot dog.

* * * * *